UNITED STATES PATENT OFFICE.

GRIFFITH MORGAN, OF ONANCOCK, VIRGINIA.

IMPROVEMENT IN UNITING COPPER BOLTS.

Specification forming part of Letters Patent No. 3,070, dated May 2, 1843.

*To all whom it may concern:*

Be it known that I, GRIFFITH MORGAN, of Onancock, in the county of Accomack and State of Virginia, have invented a new and Improved Process or Manner of Uniting Bars, Bolts, or other Pieces of Copper, by means of which process the parts are as intimately connected as two pieces of iron may be by the operation of welding, and that without use of spelter or other solder, which may form an alloy with the copper; and I do hereby declare that the following is a full and exact description thereof.

When two pieces of copper are to be united together, or two ends of one piece are to be united so as to form a ring or a link of a chain, I prepare the pieces or the ends by bringing them into a proper shape in the same manner in which iron is prepared or formed for welding. The surfaces to be united and the part surrounding them I make perfectly clean, and bind or in any other manner secure them together, as pieces are secured which are intended to be soldered. I then heat the parts which are to be joined in a forge or other fire and apply borax thereto, preferring either burnt or anhydrous borax for this purpose. When the part has been heated to such a degree as to fuse the borax I strew on a quantity of clean iron filings, allowing the iron and borax to become incorporated and to form a complete coating around the part to be joined. The piece or pieces are then to be placed in the fire and cautiously heated, so that the temperature shall be equal throughout. The heating is to be continued until the copper is ready to fuse—an operation which of course requires some care and address; but a little practice will render the process easy. When brought to the proper heat the copper is to be removed from the fire and left at rest until it has cooled down about to a cherry red, at which heat it is known that this metal is tough and may be forged out. It may then be hammered so as to put it into a proper form, and will be found to be perfectly united.

I do not attempt to describe in what way the iron exerts its agency in the production of this effect; but I have satisfactorily ascertained that it does not form an alloy with the copper which would render the joint liable to be destroyed by galvanic action when exposed to contact with acids or saline solutions, but that the copper, if pure before the process, still remains so.

Having thus fully explained and set forth the nature of the process by which I unite or join together separate bars, bolts, or other pieces of copper, or the two ends of one piece, so as to form a link or ring, which piece or pieces shall be perfectly united without being alloyed, as is the case when such pieces are joined by being brazed or soldered, what I claim as new, and desire to secure by Letters Patent, is—

The employment of iron filings, or of iron in any other convenient form, with borax or some analogous flux applied to the parts to be joined, covering the said joint therewith in the manner in which solder is ordinarily applied, and heating the whole in a suitable forge or other fire nearly to the fusing-point of copper, substantially in the manner and for the purpose herein set forth.

GRIFFITH MORGAN.

Witnesses:
L. L. JONES, Sr.,
GEORGE F. SNEAD,
JOHN W. COLONNA.